United States Patent
Hara et al.

(12) 
(10) Patent No.: US 6,294,121 B1
(45) Date of Patent: Sep. 25, 2001

(54) MOLD FOR COMPRESSION MOLDING A RESIN ARTICLE

(75) Inventors: Takahisa Hara; Masahito Matsumoto; Nobuhiro Usui; Shigeyoshi Matsubara, all of Osaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 08/190,566

(22) Filed: Feb. 2, 1994

Related U.S. Application Data

(60) Continuation of application No. 07/873,893, filed on Apr. 24, 1992, now abandoned, which is a division of application No. 07/545,868, filed on Jun. 29, 1990, now abandoned.

(30) Foreign Application Priority Data

Jun. 30, 1989 (JP) .................................................. 1-170812

(51) Int. Cl.⁷ .............................. B29C 45/34; B29C 45/56
(52) U.S. Cl. .................................. 264/328.7; 264/328.11; 425/546
(58) Field of Search ........................... 264/328.7, 328.11; 425/546, 150

(56) References Cited

U.S. PATENT DOCUMENTS

| | | |
|---|---|---|
| 2,224,852 | 12/1940 | Lowry . |
| 2,818,604 * | 1/1958 | Miller et al. ......................... 425/812 |
| 3,108,339 * | 10/1963 | Bucy ..................................... 425/812 |
| 3,632,729 * | 1/1972 | Bielfeldt ............................ 264/328.7 |
| 4,014,970 * | 3/1977 | Jahnle ................................ 264/325 |
| 4,309,379 * | 1/1982 | Dannels et al. .................... 264/328.7 |
| 4,712,765 * | 12/1987 | Sabet ..................................... 425/812 |
| 4,715,804 * | 12/1987 | Takahashi ....................... 264/328.11 |
| 4,776,782 * | 10/1988 | Murayama et al. ................. 425/150 |
| 4,795,331 * | 1/1989 | Cain et al. ........................... 425/812 |
| 4,917,840 * | 4/1990 | Harada et al. ................... 264/328.11 |
| 4,932,857 * | 6/1990 | Nishino et al. ....................... 425/406 |

FOREIGN PATENT DOCUMENTS

| | | | |
|---|---|---|---|
| 2118079 | 7/1972 | (FR) . | |
| 1016124 * | 2/1964 | (GB) | ..................................... 425/812 |
| 1177705 * | 1/1970 | (GB) | ................................. 264/328.7 |
| 62-179909 * | 8/1987 | (JP) | ...................................... 264/266 |
| 62-244608 * | 10/1987 | (JP) | ...................................... 425/420 |
| 63-149121 * | 6/1988 | (JP) | ...................................... 425/420 |
| 2-052709 | 2/1990 | (JP) . | |

OTHER PUBLICATIONS

Design of Plastic Moulds and Dies, by Laszlo Sors and Imre Balazs, from "Studies in Polymer Science", vol. 3, p. 17.

"Duroplaste", Kunststoff Handbuch 10, by Professor Dr. Wilbrand Woebcken, p. 301.

"Plastics Engineering", vol. XL No. 10, Oct. 1984, pp. 36 and 37.

* cited by examiner

*Primary Examiner*—Jill L. Heitbrink
(74) *Attorney, Agent, or Firm*—Birch, Stewart, Kolasch & Birch, LLP

(57) ABSTRACT

A mold for compression molding a resin article, which mold consists of male and female molds, wherein, at the time of complete mold closing, the length L in a mold closing direction of a mated part formed between the outermost wall of said male mold and the innermost wall of said female mold satisfies the equation:

$$(t_1-t_0+10)\text{mm} \geq L \geq (t_1-t_0)\text{mm}$$

wherein $t_1$ is a distance (mm) between the male and female molds when the resin melt first reaches the mating outermost edge of the male mold, and $t_0$ is a distance (mm) in the mold closing direction between the same points on the male and female molds as those used for measuring $t_1$ when the mold closing is complete, and the horizontal distance of a mating gap between the outermost wall surface of said male mold and the innermost wall surface of said female mold is from 0.02 to 0.1 mm, with which mold, squeeze-out of a resin melt during molding is prevented.

11 Claims, 5 Drawing Sheets

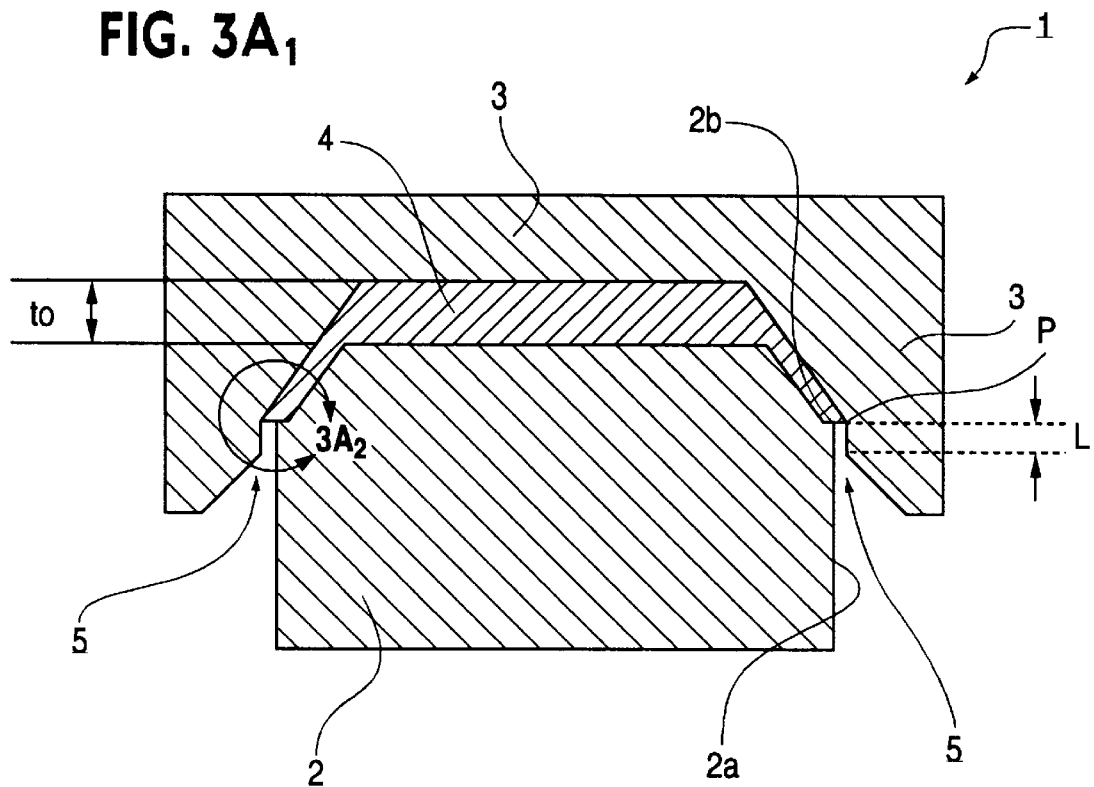
FIG. 3A₁
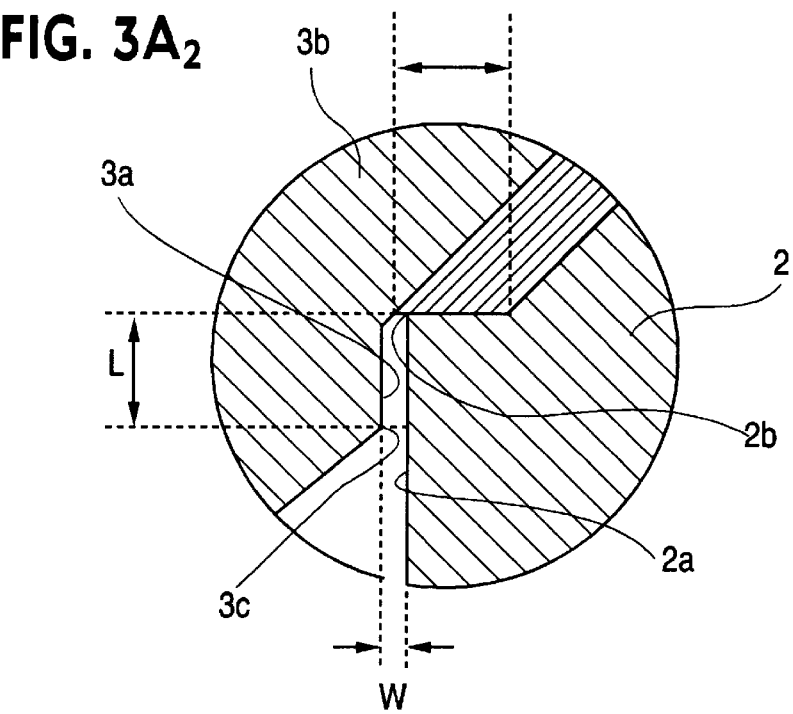
FIG. 3A₂

MOLD FOR COMPRESSION MOLDING A RESIN ARTICLE

This application is a continuation, of application Ser. No. 07/873,893 filed on Apr. 24, 1992, which is a divisional application of Ser. No. 07/545,868 filed on Jun. 29, 1990, both now abandoned.

BACKGROUND OF THE INVENTION

1. Field of the Invention

The present invention relates to a mold for compression molding a resin article. More particularly, the present invention relates to a mold for compression molding a resin into a molded resin article, which mold can produce a molded resin article while preventing squeeze-out of the resin melt from the mold and leaving no air in the mold cavity during molding.

2. Description of the Related Art

As a method for compression molding a resin into a molded article, there is known a method comprising supplying a resin melt to a cavity formed in a mold consisting of male and female mold portions and closing the male and female mold portions to mold the resin.

In the conventional method, the upper (female) and lower (male) molds 21 and 22 are once opened and then closed to mate with each other in the vertical direction V as shown in FIG. 1A, whereby a cavity 23 is formed therebetween and the resin melt 24 is compressed. Therefore, a dimensional accuracy of the molds 21 and 22 is strictly defined. In particular, a mold edge 21a of the upper mold 21 and a mold edge 22a of the lower mold 22 are so designed that no gap is formed in the horizontal direction H or the length L' of the mated part is made unnecessarily long (see. FIG. 1B) whereby the excess resin melt is squeezed out from the end of the edges 21a and 22a so that, as shown in FIG. 2B, the molded article 25 has an irregular shape.

However, if the size accuracy is too strict or the length L' is too long, air 26 can be trapped in the cavity 23 as shown in FIG. 1B, so that, as shown in FIG. 2A, the molded article 27 has an underfilld part 28.

In addition, the edges 21a and 22a may engage each other and may be damaged.

SUMMARY OF THE INVENTION

An object of the present invention is to provide a mold for compression molding a resin article, which can prevent squeeze-out of a resin melt and also prevent the formation of air pockets in the mold cavity during molding.

Accordingly to the present invention, there is provided a mold for compression molding a resin article, which mold consists of male and female mold portions, wherein, at the time of complete mold closing, the length L in the mold closing direction of a mated parts formed between the outermost wall of said male mold portion and the innermost wall of said female mold portion satisfies the equation:

$$(t_1-t_0+10)\text{mm} \geq L \geq (t_1-t_0)\text{mm}$$

wherein $t_1$ is a distance (mm) in the mold closing direction at an arbitrary point between the male and female molds when the resin melt first reaches the horizontally mating edge of the male mold, and $t_0$ is a distance (mm) in the mold closing direction between the same points on the male and female molds as those used for measuring $t_1$ when the mold closing is complete and wherein the horizontal distance of a mating gap between the outermost wall surface of said male mold and the innermost wall surface of said female mold is from 0.02 to 0.1 mm.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 1A and 1B are cross sectional views of the conventional mold before closing and after complete closing of the mold, respectively.

DETAILED DESCRIPTION OF THE DRAWINGS

Figure 1A:
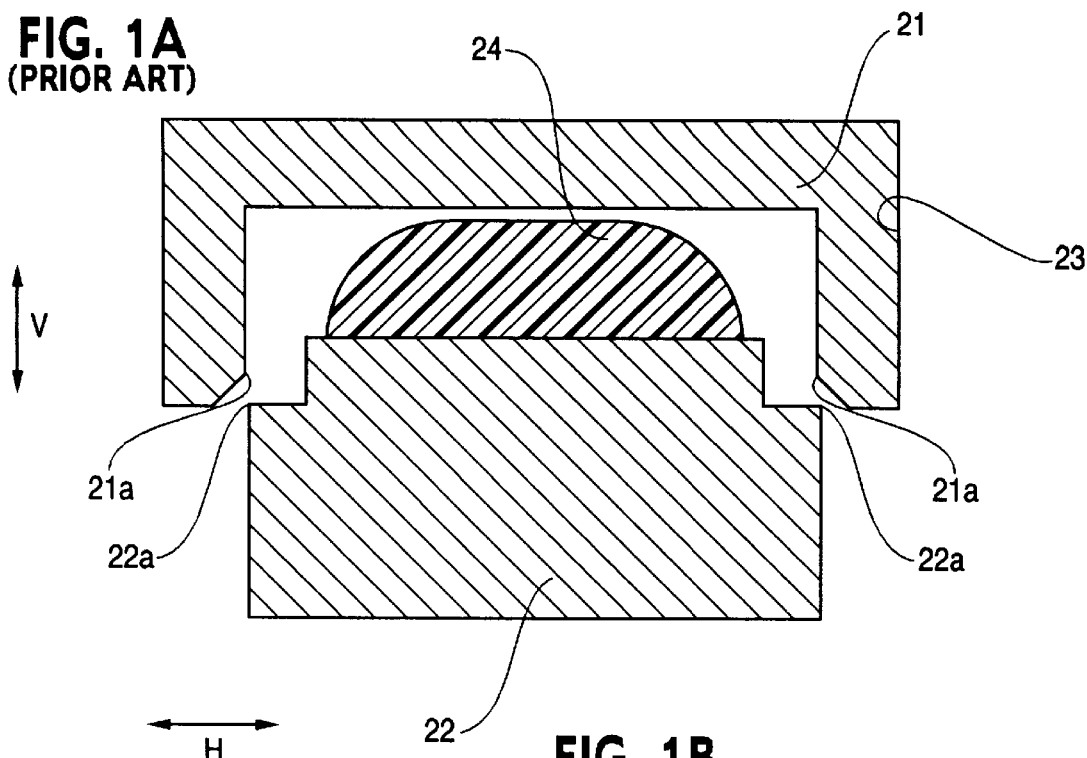
Figure 1A:
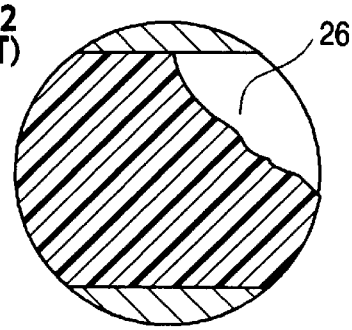
Figure 1A:
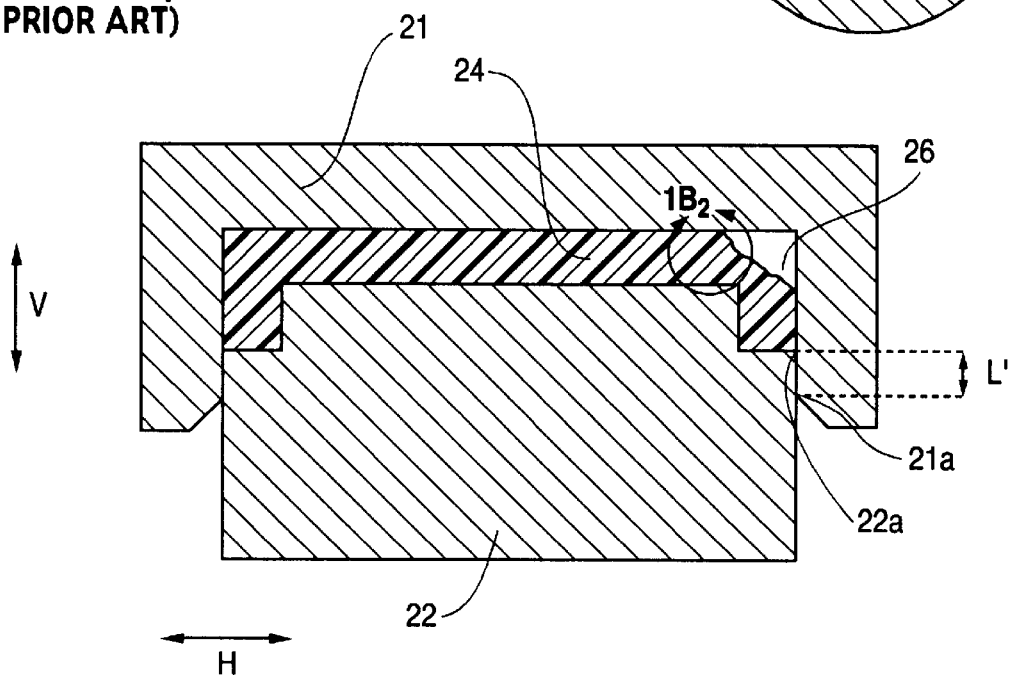
Figure 2A:
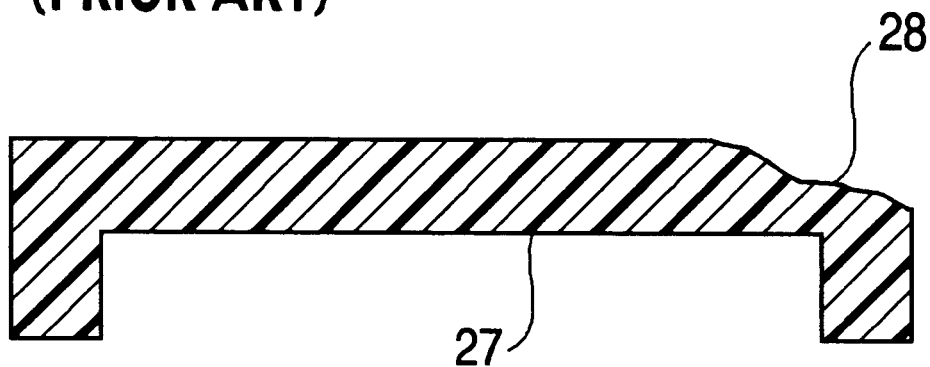
FIGS. 2A and 2B are cross sectional views of the molded articles produced with the conventional mold of FIG. 1, FIGS. $3A_1$, $3_2$, 3B and 3C schematically show steps for producing a resin molded article with the mold according to the present invention.
Figure 2B:
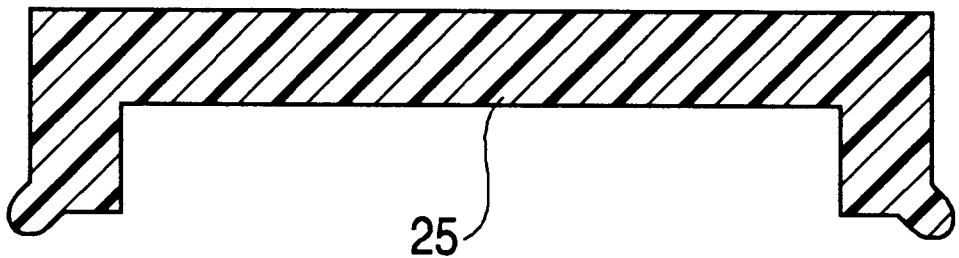

Now, the present invention will be explained by making reference to the accompanying drawings.

FIG. $3A_1$ is a cross sectional view of one embodiment of the mold according to the present invention when the mold closing is completed FIG. $3A_2$ is an exploded view of a portion of FIG. $3A_1$.

The mold 1 comprises a male mold 2 and a female mold 3 which mates with the male mold 2.

In this embodiment, the male mold 2 is fixed and the female mold 3 is moved vertically with a well known lifting mechanism (not shown).

When the mold closing is completed, a mating gap 5 is formed between the outermost wall surface 2a of the male mold 2 and the innermost wall surface 3a of the female mold 3.

In the present invention, the shortest horizontal gap distance (W) of the mated part between said outermost wall of the male mold and said innermost wall of the female mold is from 0.02 to 0.1 mm, preferably from 0.02 to 0.08 mm, and through the gas of the mated part, the air in the mold cavity 6 escapes during mold closing. However, said gap should not be large enough for the rein melt to squeeze out. The actual gap distance is defined according to the kind, viscosity, temperature and/or the amount of resin supplied.

For example, in a case where a disc of 30 cm in diameter is molded under mold closing pressure of 100 kg/cm² from polypropylene (Sumitomo Noblen (trade mark) AX 568 manufactured by Sumitomo Chemical Co., Ltd. having a melt flow index of 65 g/10 minutes) at a resin temperature of 260° C. and a mold temperature of 60° C., the squeezed out amount of the resin is less than 0.1 mm when the gap distance W is 0.02 mm. In a case where the same disc as above is molded under the same molding conditions from a methacrylate resin (Sumipex-B (trade mark) MHO manufactured by Sumitomo Chemical Co., Ltd.), the squeezed out amount of the resin is less than 0.1 mm when the gap distance is 0.06 mm. In both cases, the air in the cavity can escape to the outside at the above gap distances.

Figure 3B:
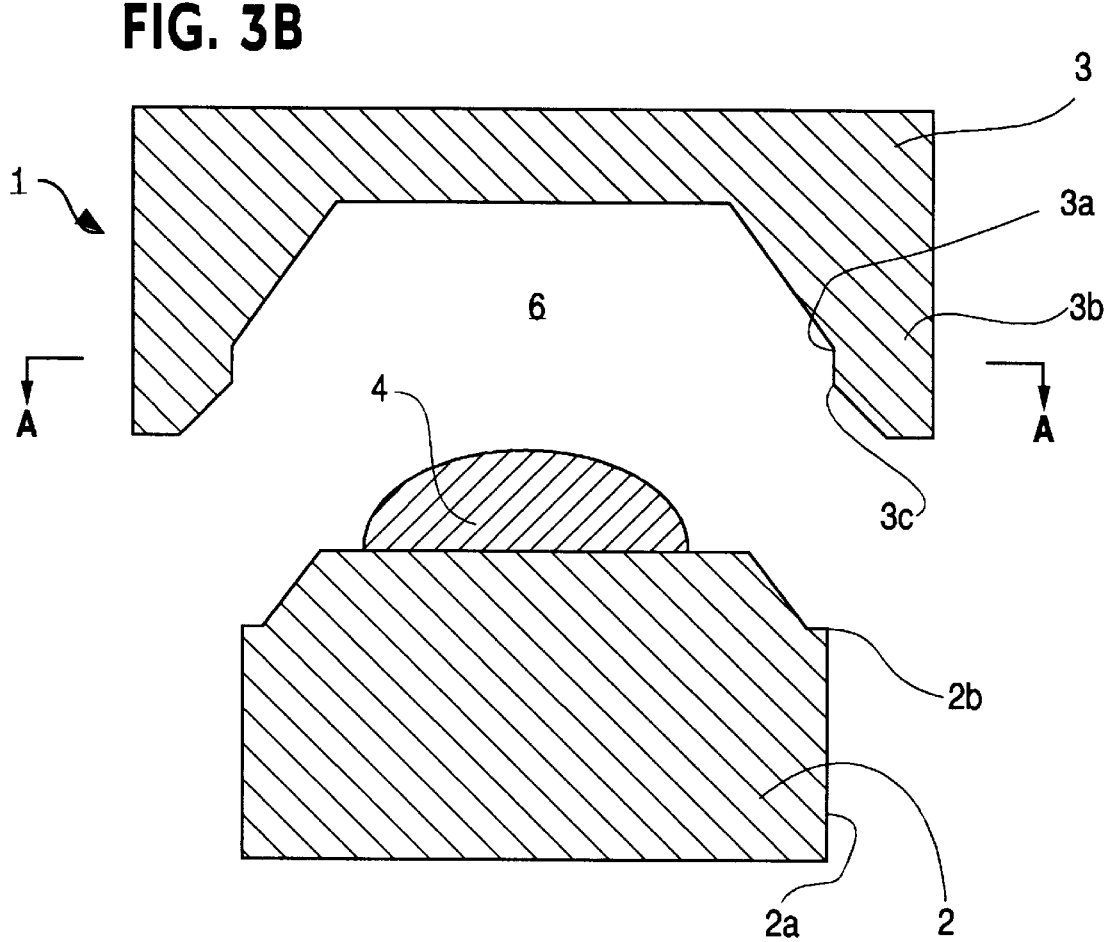
Figure 4:
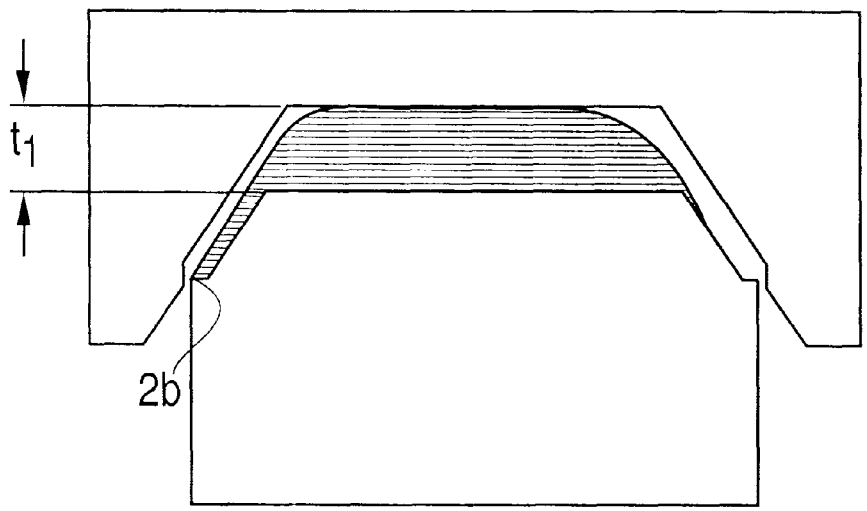
FIG. 4 is a cross sectional view of the mold of the present invention showing $t_1$.
Figure 5:
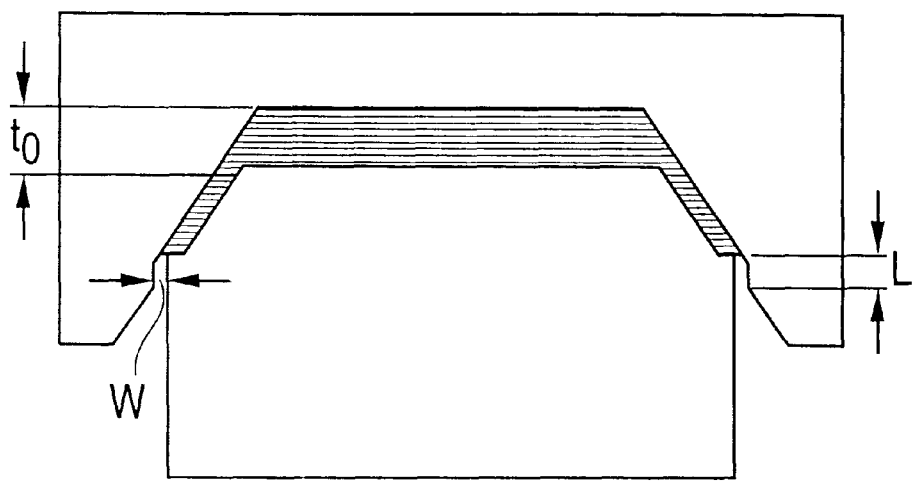
FIG. 5 is a cross sectional view of the mold of the present invention showing $t_0$.

In addition, the length L in the mold closing direction of the mated part formed between the outermost wall of the male mold and the innermost wall of the female mold satisfies the equation:

$$(t_1-t_0+10)\text{mm} \geq L \geq (t_1-t_0)\text{mm}$$

wherein $t_1$ and $t_0$ are the same as defined above (see FIGS. 3A$_1$ and 3A$_2$. The relationship of $t_1$ to $t_0$ is also shown in FIGS. 4 and 5.

The reason why the length L in the mold closing direction is adjusted in the above range is that when the length L is longer than the above upper limit, it is necessary to open the male and female molds to an unnecessary distance and the productivity is decreased, and the air is easily trapped in the cavity, so that defective molded articles may be produced. When said length L is shorter than the above lower limit, the resin melt tends to be squeezed out so that a defective molded article is also produced.

The length L in the molding direction of the mated part is not necessarily uniform around the whole circumference of the mold. At least at a point P of the horizontally outermost edge of the male mold to which the resin melt first contacts (see FIG. 3C), the length L of the mated part L should satisfy the above equation. At other points, the length of the mated part may be from zero to L.

Figure 3C:
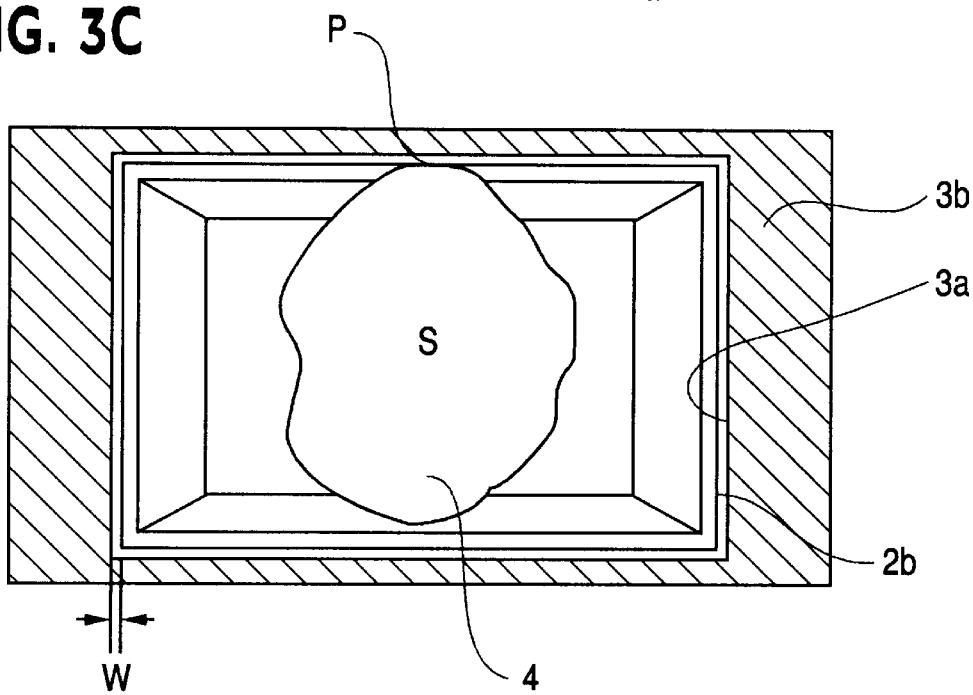

With the mold according to the present invention, the molded article can be produced by the following steps:

1. A mass of the resin melt 4 is supplied between the male mold 2 and the female mold 3. In FIG. 3B, the mass of resin melt is supplied on the male mold 2.

The resin melt can be supplied by any conventional means. For example, the resin melt can be supplied through a resin supplying conduit which is formed in the mold (not shown) with means for melting and plasticizing the resin such as an extruder (not shown).

2. By actuating the lifting mechanism, the female mold is lowered to press the resin melt, whereby the resin melt flows and spreads between the male mold 2 and the female mold 3. Then, the air in the cavity is forced to escape through the gap 5. Since the gap distance W is in the above range, the resin melt is not squeezed out through the gap between the mold parts.

3. The female mold is further lowered, and finally, the male and female molds are completely closed to complete the molding of resin (see FIG. 3A).

In the molding process, the timing of the resin melt supply is not limited to the above described timing. The resin melt can be supplied at any time before the male and female molds are completely closed.

The relative position of the male and female molds and the closing direction can be freely selected.

As the resin to be molded with the mold of the present invention, any of the conventional resins used in compression molding, injection molding and extrusion molding can be used. Specific examples of the resin include non-expandable or expandable resins of thermoplastic resins (e.g. polypropylene, polyethylene, polystyrene, acrylonitrilestyrene-butadiene copolymer, nylon, etc.), and thermoplastic elastomers (e.g. ethylene-propylene block copolymer, styrene-butadiene block copolymer, etc.). The resin may contain at least one additive such as fillers (e.g. inorganic fillers and glass fibers), pigments, lubricants, antistatic agents and the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for compression molding of a resin article comprising the steps of:

providing opposing male and female mold portions, the mold portions being movable between open and closed states;

introducing a resin material in a flowable state between the mold portions while the mold portions are in the open state;

moving the mold portions toward one another from the open state to the closed state;

spreading the resin material between the male mold portion and the female mold portion as the mold portions are moved to the closed state;

forcing air from a cavity between the male mold portion and female mold portions as the mold portions are moved to the closed state, the air being forced through a space between the male and female mold portions;

forming an annular mating gap between the male and female mold portions in the closed state, the annular mating gap being formed by a flange on the female mold portion which overhangs sidewalls of said male mold portion by a distance L in a mold closing direction forming a mating edge therewith when the molds are closed;

providing the distance L to satisfy the equation $$(t_1-t_0+10)\text{mm} \geq L \geq (t_1-t_0)\text{mm}$$

wherein:

$t_1$ is a distance in mm in the mold closing direction between the male and female mold portions when the resin material first reaches the mating edge of the male mold portion; and $t_0$ is a distance in mm in the mold closing direction between the same points on the male and female mold portions as those used for measuring $t_1$, when the mold closing is complete; and making width of the mating gap between the male and female mold portions from 0.02 to 0.1 mm.

2. The method for compression molding of a resin article according to claim 1, wherein the step of making width of the mating gap comprises the step of making the width of the mating gap from 0.02 to 0.08 mm.

3. The method for compression molding of a resin article as recited in claim 1, wherein the step of making the width of the mating gap further comprises the steps of:

allowing the air to escape from the cavity during the step of forcing due to the width of the mating gap; and preventing escape of resin from between the male and female mold portions due to the width of the mating gap.

4. The method for compression molding of a resin article as recited in claim 3, wherein the step of introducing the resin material occurs at a point at an outermost edge of the male mold portion and wherein the step of providing the distance L satisfied the equation $$(t_1-t_0+10)\text{mm} \geq L \geq (t_1-t_0)\text{mm}$$

at the point where resin material is introduced.

5. The method for compression molding of a resin article as recited in claim 1, wherein the step of introducing the resin material occurs at a point at an outermost edge of the male mold portion and wherein the step of providing the distance L satisfied the equation $$(t_1-t_0+10)\text{mm} \geq L \geq (t_1-t_0)\text{mm}$$

at the point where resin material is introduced.

6. The method for compression molding of a resin article as recited in claim 1, wherein the step of moving comprises lowering the female mold portion toward the male mold portion.

7. The method for compression molding of a resin article as recited in claim 1, wherein the step of introducing the resin material occurs after the step of moving the mold portions has begun but before the male and female mold portions reach the closed state.

8. The method for compression molding of a resin article as recited in claim 1, further comprising the step of using one of non-expandable thermoplastic resin, expandable thermoplastic resin and thermoplastic elastomers as the resin material.

9. The method for compression molding of a resin article as recited in claim 8, wherein the resin material is one of polypropylene, polyethylene, polystyrene, acrylonitrile-styrene-butadiene copolymer, nylon, ethylene-propylene block copolymer and styrene-butadiene block copolymer.

10. The method for molding of a resin article as recited in claim 1, further comprising the step of providing at least one additive to the resin material, the additive being at least one of fillers, pigments, lubricants and antistatic agents.

11. The method of molding of a resin article as recited in claim 1, wherein the step of forcing air removes air only through the space between the male and female mold portions.

* * * * *